United States Patent [19]

Borzym

[11] Patent Number: 4,865,300
[45] Date of Patent: Sep. 12, 1989

[54] TUBE HANDLING APPARATUS

[76] Inventor: John J. Borzym, 4820 Schoolbell, Birmingham, Mich. 48010

[21] Appl. No.: 149,428

[22] Filed: Jan. 29, 1988

[51] Int. Cl.[4] .............................................. B23Q 3/00
[52] U.S. Cl. ........................................ 269/13; 269/43; 269/87.2; 269/152; 269/268; 269/288
[58] Field of Search ..................... 269/13, 14, 43, 56, 269/87.2, 152, 271, 272, 287, 288, 295, 268, 289 MR, 900; 414/14, 17, 18, 431, 432; 83/54, 282, 465; 228/49.3; 264/148, 150; 425/315; 198/624

[56] References Cited

U.S. PATENT DOCUMENTS

| | | | |
|---|---|---|---|
| 2,843,176 | 9/1953 | Fronck | 269/287 |
| 3,699,201 | 10/1972 | Turner | 264/150 |
| 3,830,355 | 9/1974 | Verjux | 198/624 |
| 4,545,569 | 10/1985 | Schröder | 269/43 |

Primary Examiner—Frederick R. Schmidt
Assistant Examiner—David A. Holmes
Attorney, Agent, or Firm—Dykema Gossett

[57] ABSTRACT

An apparatus for handling tubing as the tubing is fed to a severing blade for severing into cut sections of predetermined length. The tube handling apparatus includes clamping jaws positioned at the location of the severing blade and a feed tunnel which is arranged rearwardly of the clamping jaws. The feed tunnel includes fingers at its front end which are telescopically received in drilled slots formed on the internal periphery of the clamping jaws so that even very short remnants of tubing occurring after the last full length section of tubing is cut will be maintained in alignment with the tube feed axis by the fingers of the feed tunnel to preclude movement of the remnant tubing into a position of disorientation or dislodgment where it would interfere with the operation of the tube handling apparatus.

8 Claims, 4 Drawing Sheets

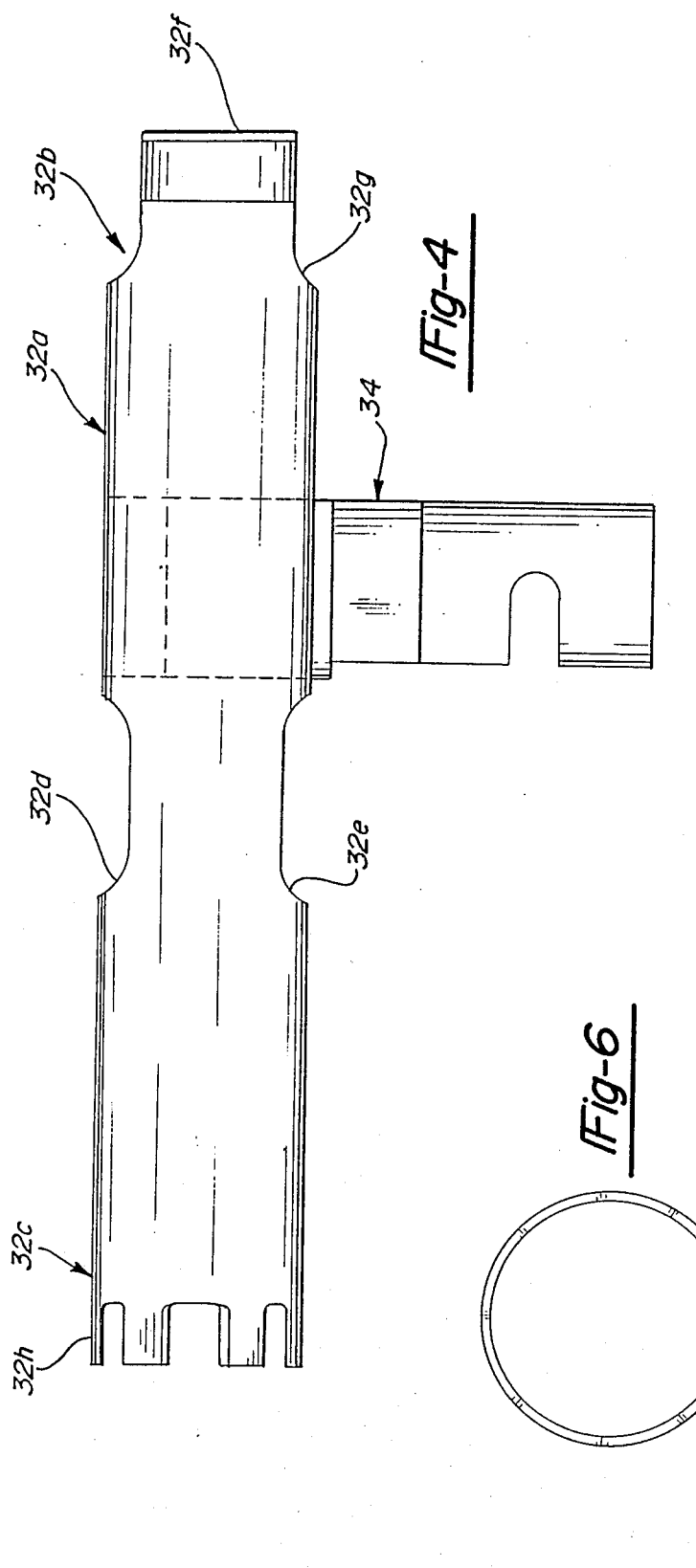

TUBE HANDLING APPARATUS

BACKGROUND OF THE INVENTION

This invention relates to tube handling apparatus and more particularly to a tube handling apparatus especially suited for handling short, remnant pieces of tubing.

Tubing is commonly fed into a tube cutting apparatus where standardized lengths of tubing are successively cut into shorter lengths of tubing by successive actuation of the cutting apparatus. In a typical tube handling apparatus of this type, the tubing is fed along a tube feed path by feed rollers or the like and the tubing is held between clamping jaws during the severing operation. After completion of the severing operation, the jaws are moved transversely outwardly to a released position and the feed mechanism is actuated to advance the tubing by a predetermined amount corresponding to the length of the desired cut length, whereafter the tubing is stopped and the jaws moved into clamping position for the next cut. Whereas this type of tube handling apparatus is generally satisfactory, problems arise with respect to the tube remnant remaining after the last full length of tubing has been severed from the original tube. Specifically, this remnant, following separation of the jaws after the last full length cut, is often disassociated from any of the feeding or alignment mechanism associated with the tube handling apparatus with the result that it becomes misaligned with respect to the tube axis, and/or falls into the associated machinery, with consequent damage to the cutting apparatus or interference with the feeding of the next standardized length of tubing to the cutting apparatus.

SUMMARY OF THE INVENTION

This invention is directed to the provision of a tube handling apparatus especially suitable for handling remnant pieces of tubing.

The tube handling apparatus of the invention is intended for handling tubing moving along a feed path centered on a feed path axis. The invention apparatus includes a pair of clamping jaws having confronting clamping surfaces and mounted for movement in a direction generally transverse to the feed path axis between a clamping position in clamping engagement with opposite sides of the tubing and a released position withdrawn from the feed path, and a feed tunnel of tubular configuration positioned along the feed path rearwardly of the jaws in concentric relation to the feed path axis and having a forward end sized and positioned to be telescopically received within the clamping jaws. With this arrangement, the final or remnant piece of tubing, no matter how short, is maintained in precise aligned relation with respect to the feed axis following withdrawal of the clamping jaws to their released position.

According to a further feature of the invention, the rearward ends of the jaws are cut away internally to telescopically receive the forward end of the feed tunnel. This arrangement provides a nesting interrelationship as between the jaws and the feed tunnel so as to facilitate the coaction of the feed tunnel and clamping jaws to maintain the remnant piece of tubing in aligned position with respect to the feed axis.

According to a further feature of the invention, the forward end of the feed tunnel includes a plurality of circumferentially spaced, axially extending fingers and the rearward ends of the jaws are selectively cut away to define individual pockets for respective telescopic receipt of the fingers.

According to a further feature of the invention, the pockets in the jaws are arcuate in transverse cross section and extend axially to a location spaced axially rearwardly of the forward ends of the jaws. This arrangement allows the jaws to have firm clamping engagement with the tubing while yet allowing the fingers on the forward end of the feed tunnel to be telescopically and precisely received within the rearward end of the jaws.

According to a further feature of the invention, there are two pairs of jaws with the jaw pairs spaced axially to define a gap therebetween for passage of a guillotine blade to sever the tubing, and the rear set of jaws is provided with the pockets for receipt of the fingers on the forward end of the tube tunnel.

According to a further feature of the invention, an axially extending slot is provided in the feed tunnel intermediate the ends of the feed tunnel for passage of a roller for engagement with the tubing passing through the tunnel. This arrangement allows a pressure roller and/or a measuring roller to engage the tubing as it passes through the feed tunnel.

According to a further feature of the invention, a further axially extending slot is provided in the feed tunnel in generally diametrically opposed relation to the first slot for passage of a further roller for engagement with the tubing passing through the tunnel. Provision of a pair of diametrically opposed slots in the feed tunnel allows a pressure roller to engage one side of the tubing passing through the tunnel and a measuring roller to engage an opposite side of the tubing passing through the tunnel.

According to a further feature of the invention, the tunnel includes an outwardly flared rearward end to facilitate piloting of tubing into the tunnel. In the disclosed embodiment of the invention, the outwardly flared rearward end of the tunnel includes a pair of diametrically opposed outwardly flared ear portions defining diametrically opposed gaps therebetween for passage of feed rollers for engagement with the tubing to feed the tubing along the feed path.

BRIEF DESCRIPTION OF THE DRAWINGS

FIG. 4 is a side-elevational view of a feed tunnel assembly employed in the tube handling apparatus of FIG. 1;

FIG. 5 is a top view of the feed tunnel assembly of FIG. 4;

FIG. 6 is a rear end view of the feed tunnel assembly of FIG. 4;

DETAILED DESCRIPTION OF THE PREFERRED EMBODIMENT

Figure 1:
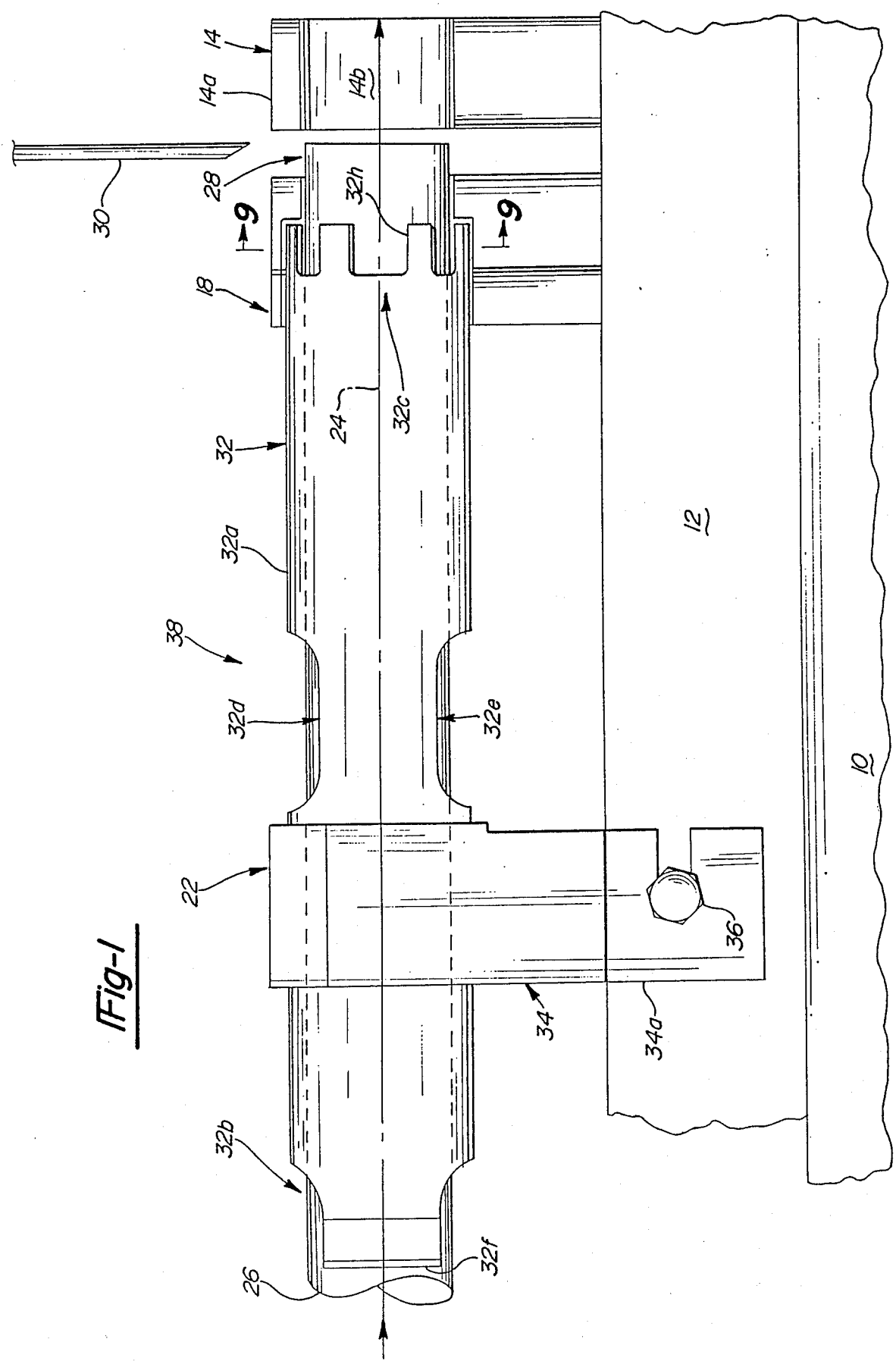
FIG. 1 is a somewhat diagrammatic, side-elevational view of a tube handling apparatus according to the invention with the near clamping jaws omitted for clarity.
Figure 2:
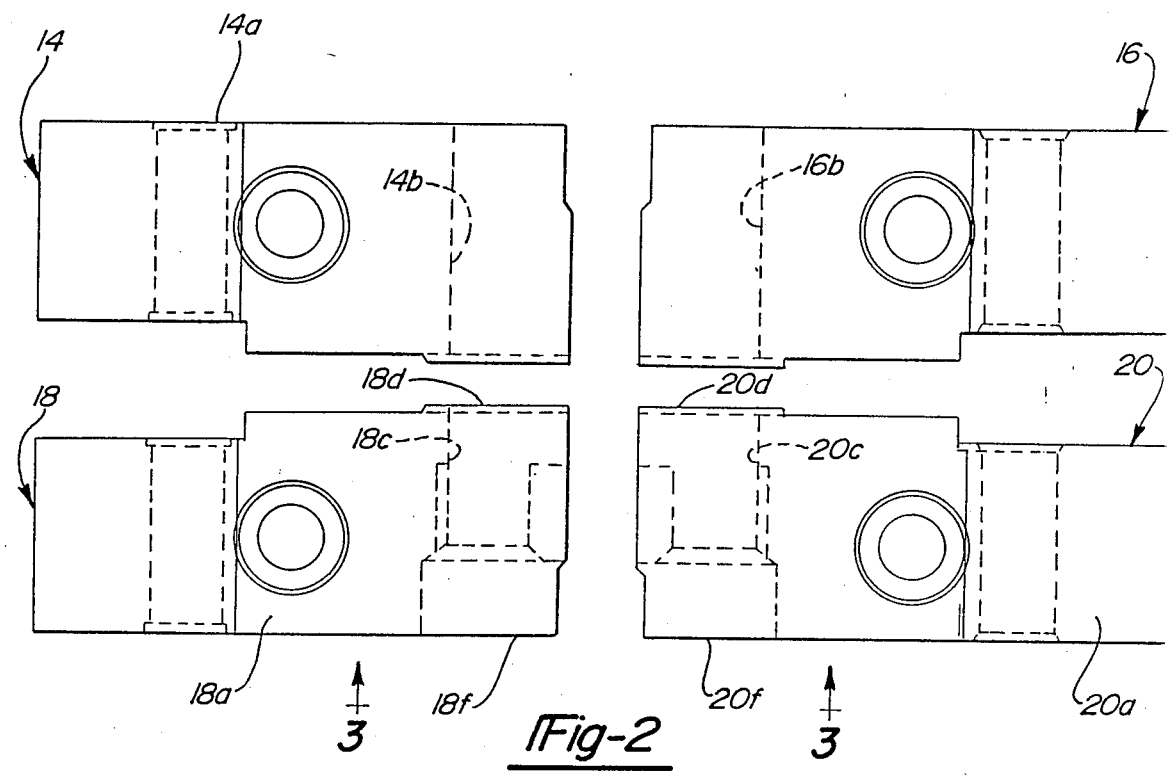
FIG. 2 is a plan view of the clamping jaws employed in the tube handling apparatus of FIG. 1.
Figure 3:
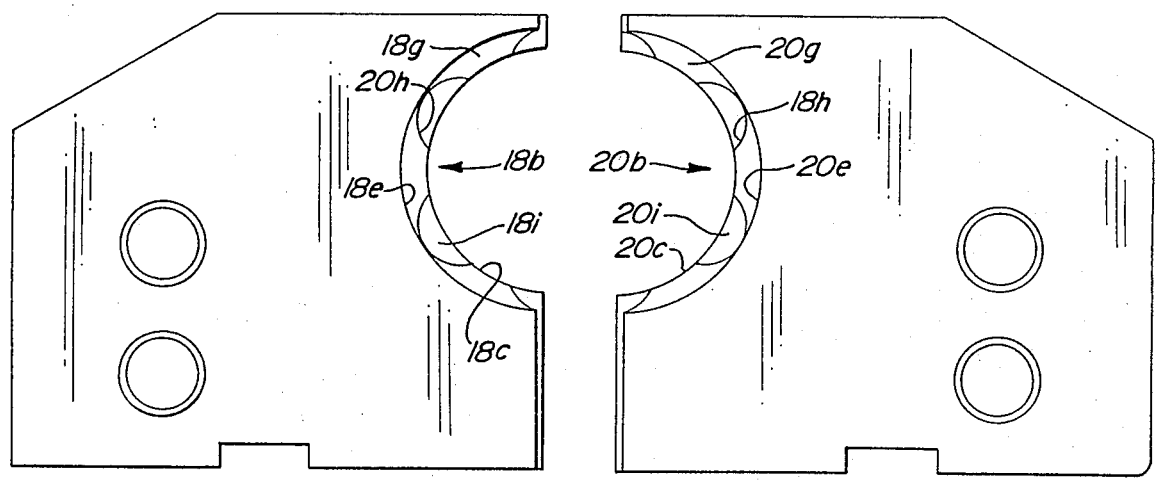
FIG. 3 is a view looking in the direction of the arrow 3 is FIG. 2.
Figure 7:
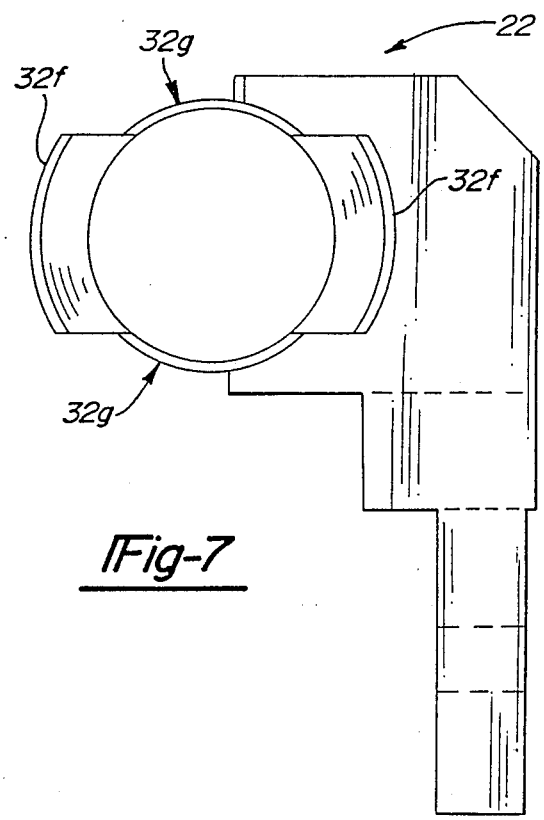
FIG. 7 is a front end view of the feed tunnel.

The tube handling apparatus of the invention includes a base member 10, a lower die shoe 12, a first forward set of clamping jaws 14,16, a second rearward set of clamping jaws 18,20 and a feed tunnel assembly 22.

Base 10 may comprise, for example, the bed of a suitable press and lower die shoe 12 is suitably supported on the bed 10. Clamping jaw sets 18,20 and 14,16 are supported on lower die shoe 12 and are mounted in known manner on the lower die shoe for reciprocal movement in a direction generally transverse to the central axis 24 of the tube feed path between a clamping position in clamping engagement with opposite sides of tubing 26 moving along the feed path and a released position in which the jaws are transversely withdrawn from the feed path. Forward jaws 14 and 16 are of known construction and include a main body portion 14a, 16a of generally block configuration and confronting arcuate clamping surfaces 14b, 16b. Clamping surfaces 14b, 16b have a radius of curvature generally corresponding to the radius of curvature of tubing 26 and coact in the clamped position of the jaw to clampingly engage the opposite arcuate side faces of the tube. Forward jaws 14,16 are spaced axially forwardly from rearward jaws 18 and 20 to provide a gap 28 therebetween for passage in known manner of a guillotine blade 30 secured to an upper die shoe (not shown).

Rearward clamping jaws 18,20 include a main body portion 18a, 20a and generally arcuate clamping surfaces 18b, 20b. Clamping surfaces 18b, 20b are compound and include a main bore portion 18c, 20c extending rearwardly from the forward end 18d, 20d of the jaws and having a radius of curvature generally corresponding to the radius of curvature of tubing 26; a counter bore portion 18e, 20e extending forwardly from the rearward end 18f, 20f of the jaws and forming an angled annular shoulder 18g, 20g with main bore portion 18c, 20c; and a plurality of circumferentially spaced drilled arcuate slots 18h, 20h extending forwardly from shoulder 18g, 20g and terminating in end faces 18i, 20i spaced rearwardly from jaw forward ends 18d, 20d.

Feed tunnel assembly 22 includes a feed tunnel 32 and a mounting bracket 34.

Feed tunnel 32 is formed of suitable metallic tubular stock and includes a central main body portion 32a, a rearward end portion 32b, and a forward end portion 32c.

An upper rectangular slot 32d is formed in main body portion 32a, intermediate ends 32b,32c, and a lower rectangular slot 32e is formed in tunnel main body portion 32a in generally diametrically opposed relation to slot 32d.

Tunnel rear end portion 32b includes a pair of diametrically opposed, laterally outwardly flared ear portions 32f and upper and lower slots 32g defining gaps between the ear portions.

Figure 9:
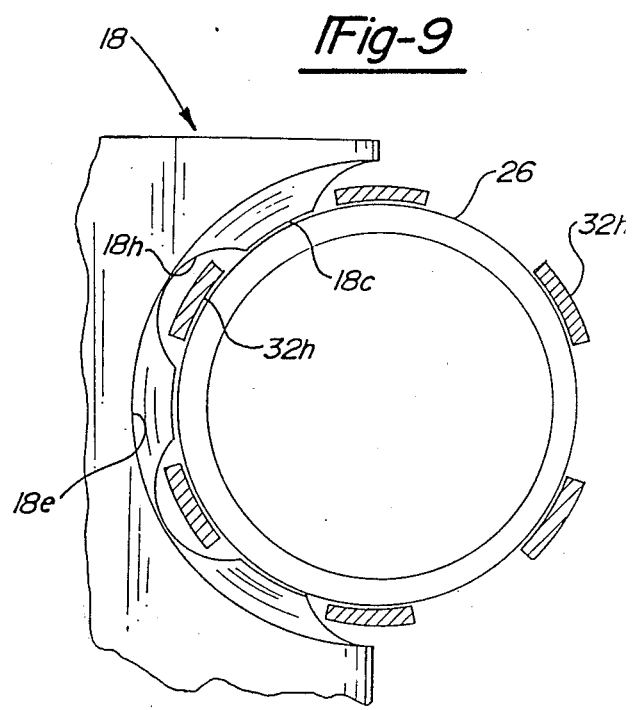
FIG. 9 is a fragmentary cross-sectional view taken on line 9—9 of FIG. 1.
Figure 8:
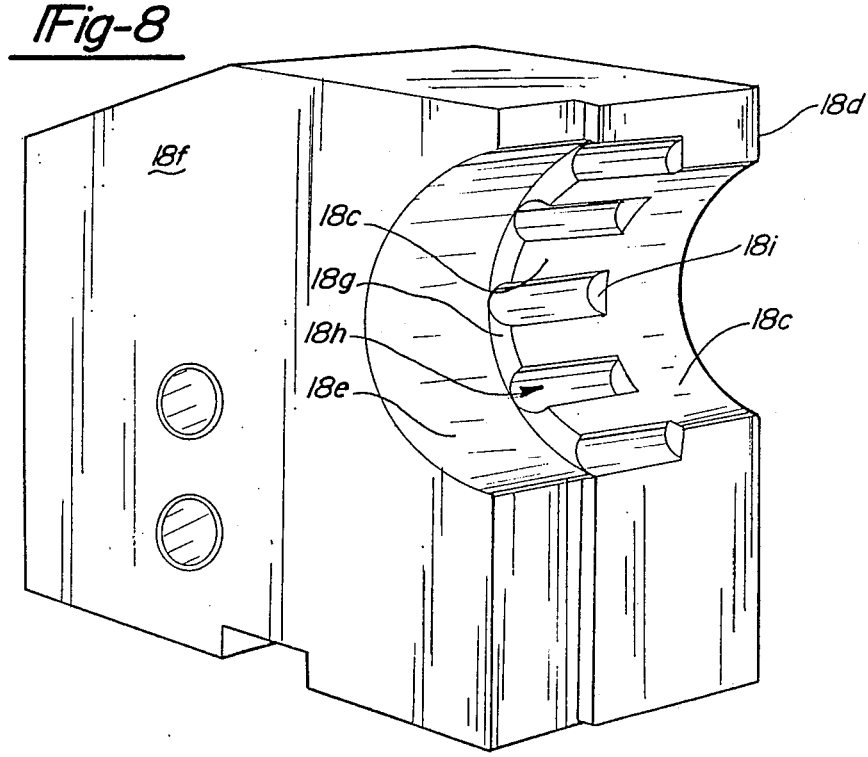
FIG. 8 is a perspective view of a clamping jaw according to the invention.

Tunnel forward end portion 32c is selectively cut away to define a plurality of circumferentially spaced, axially extending fingers 32h corresponding in number and circumferential spacing to drilled slots 18a, 20a in rearward clamping jaws 18,20. As best seen in FIG. 9, fingers 32h have an arcuate or circumferential extent slightly less than the arcuate or circumferential extent of slots 18h, 20h.

Feed tunnel 32 has an inner diameter slightly exceeding the outer diameter of tubing 26 and an outer diameter somewhat less than the diameter of jaw counter bores 18e, 20e.

Bracket 34 is welded at its upper end to main body portion 32a of feed tunnel 32 and extends downwardly therefrom generally at right angles to the central axis of the feed tunnel.

In the assembled relation of the invention tube handling apparatus, the lower end 34a of bracket 34 is secured as by a bolt 36 to lower die shoe 12 to position feed tunnel 32 along the tube feed path rearwardly of the die jaws in concentric relation to feed path axis 24 with the forward end portion 32c of the feed tunnel received telescopically within the rearward end of clamping jaws 18,20. Specifically, with the jaws in their clamping position, fingers 32h are respectively received in the drilled slots 18h and the forward ends of the fingers are positioned proximate the end faces 18i of the drilled slots. In this relative disposition of the fingers 32h and jaws 18,20 the internal peripheral arcuate surfaces of the fingers 32h coact with the portions of main body bore 18c, 20c between the fingers to define a generally continuous circular surface to support tubing 26 and yet the arcuate configuration of slots 18h relative to fingers 32h allows the jaws to be moved freely away from the fingers 32h to the released or withdrawn position of the jaws.

In the operation of the invention tube handling apparatus, feed rollers 36 are positioned in the gaps 32g defined between ear portions 32f at the rear end of the tube tunnel and drivingly engage tubing 26; a pressure roller 38 passes through slot 32d in the feed tunnel for engagement with the upper surface of tubing 26; and a tracking or measuring roller 40 passes through slot 32e in the feed tunnel for engagement with the lower surface of tubing 26. Feed rollers 36 may, for example, be part of a tube feed apparatus of the type disclosed in co-pending U.S. patent application Ser. No. 149,837 filed on 1/29/88 and assigned to the assignee of the present invention.

As tubing 26 is fed through feed tunnel 32 to the clamping jaws, the clamping jaws move alternatively into and out of clamping engagement with the tubing as incremental lengths of tubing are fed to the clamping jaws, as measured by measuring roller 40, for severing by guillotine blade 30. So long as a relatively long length of tubing remains after the severing operation by guillotine blade 30, the feed tunnel serves only as a general guide device for the tubing. However, once the remnant remaining after the operation of the guillotine blade 30 is reduced to a length significantly less than the preselected lengths being cut from the tubing, feed tunnel 22 functions to maintain the remnant tubing in a position of alignment on the feed axis even after the jaws have been withdrawn to their released position. Specifically, if the remnant remaining after the last full length cut is so short as to be out of engagement with feed rollers 36 and pressure and measuring rollers 38 and 40, the feed tunnel functions to maintain the tubing remnant in alignment with the tube feed axis, rather than allowing the segment to fall downwardly between the jaws following withdrawal of the jaws to their released position or to become otherwise skewed with respect to the feed axis with consequent interference with subsequent lengths of tubing fed to the tube handling apparatus. The remnant tubing, for example, may have such a short length that it is totally contained within the profile of jaws 18 and 20 and yet the feed tunnel, and in particular the fingers 32h, will function to maintain the short remnant in alignment with feed axis 24 from where it may be subsequently displaced and moved down the feed axis by the arrival of the next length of tubing to be severed into predetermined lengths.

The invention tube handling apparatus will be seen to provide a simple and inexpensive arrangement for insuring that the remnant pieces of tubing occurring after the severing of the last full length section of tubing will not become disoriented with respect to the feed axis and will not interfere with the subsequent operation of the tube handling apparatus.

Whereas a preferred embodiment of the invention has been illustrated and described in detail it will be apparent that various changes may be made in the disclosed embodiment without departing from the scope or spirit of the invention.

I claim:

1. A tube handling apparatus for handling tubing moving along a feed path centered on a feed path axis, said apparatus comprising:
   (a) a pair of clamping jaws having confronting clamping surfaces and mounted for movement in a direction generally transverse to the feed path axis between a clamping position in clamping engagement with opposite sides of the tubing and a released position withdrawn from the feed path; and
   (b) a feed tunnel of tubular configuration positioned along said feed path rearwardly of said jaws in concentric relation to said feed path axis and having a forward end sized and positioned to be received within the clamped jaws;
   (c) the rearward ends of said jaws are cut away internally to telescopically receive said forward end of said feed tunnel;
   (d) said forward end of said feed tunnel includes a plurality of circumferentially spaced, axially extending fingers; and
   (e) said rearward ends of said jaws are further selectively cut away to define individual pockets for respective telescopic receipt of said fingers.

2. A tube handling apparatus according to claim 1 wherein:
   (f) said pockets comprise a plurality of axially extending circumferentially spaced slots; and
   (g) said slots are arcuate in transverse cross section and extend axially to a location axially rearwardly of the forward ends of said jaws.

3. A tube handling apparatus according to claim 2 wherein:
   (h) said pair of clamping jaws comprise a first pair of clamping jaws and said apparatus further includes a second pair of clamping jaws having confronted arcuate clamping surfaces for clamping engagement with the opposite sides of the tubing and spaced forwardly of said first pair of clamping jaws to define a gap therebetween for passage of a guillotine blade to sever the tubing.

4. A tube handling apparatus according to claim 1 wherein:
   (f) an axially extending slot is provided in said feed tunnel intermediate the ends thereof for passage of a roller for engagement with the tubing passing through said tunnel.

5. A tube handling apparatus according to claim 4 wherein:
   (g) a further axially extending slot is provided in said feed tunnel in generally diametrically opposed relation to the first slot for passage of a roller for engagement with the tubing passing through said tunnel.

6. A tube handling apparatus according to claim 5 wherein:
   (h) said tunnel includes an outwardly flared rearward end to facilitate piloting of tubing into said tunnel.

7. A tube handling apparatus according to claim 6 wherein:
   (i) said outwardly flared rearward end includes a pair of diametrically opposed outwardly flared ear portions defining diametrically opposed gaps therebetween for passage of feed rollers for engagement with the tubing to feed the tubing along said feed path.

8. A tube handling apparatus for handling tubing moving along a feed path centered on a feed path axis, said apparatus comprising:
   (A) a pair of clamping jaws mounted for movement between a clamping position in clamping engagement with opposite sides of the tubing and a released position withdrawn from the tube feed path;
   (B) a clamping surface defined on each clamping jaw;
   (C) a plurality of circumferentially spaced axially extending slots opening in said clamping surfaces; and
   (D) a feed tunnel of tubular configuration positioned rearwardly of said jaws on said feed axis and including a plurality of circumferentially spaced fingers at its forward ends sized to be received respectively in said slots with said jaws in their clamping position.

* * * * *